United States Patent
Ekoue-Kovi et al.

(10) Patent No.: US 11,981,871 B1
(45) Date of Patent: May 14, 2024

(54) METHODS OF DESIGNING GREEN DEMULSIFIERS

(71) Applicant: Baker Hughes Oilfield Operations LLC, Houston, TX (US)

(72) Inventors: Kekeli A. Ekoue-Kovi, Rosenberg, TX (US); Wojciech Jakubowski, Sugar Land, TX (US); Kui Xu, Sugar Land, TX (US); Xiaofeng Wang, Katy, TX (US); Onome Ugono, Sugar Land, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/120,599

(22) Filed: Mar. 13, 2023

(51) Int. Cl.
  *C10G 33/04* (2006.01)
  *C08G 63/668* (2006.01)
  *C09K 8/36* (2006.01)

(52) U.S. Cl.
  CPC .......... *C10G 33/04* (2013.01); *C08G 63/668* (2013.01); *C09K 8/36* (2013.01); *C10G 2300/1033* (2013.01)

(58) Field of Classification Search
  CPC ............ C10G 33/04; C10G 2300/1033; C08G 63/668; C09K 8/36
  See application file for complete search history.

(56) References Cited

U.S. PATENT DOCUMENTS

| 8,192,727 B1 | 6/2012 | Olenick et al. |
| 9,695,366 B2 | 7/2017 | Bevinakatti et al. |

FOREIGN PATENT DOCUMENTS

WO  WO-2020120630 A1 * 6/2020 ........... B01D 17/047

OTHER PUBLICATIONS

Goddard, Amy R., et al., "Synthesis of water-soluble surfactants using catalysed condensation polymerisation in green reaction media", Poly Chem, Apr. 2021, 2992-3003.

* cited by examiner

*Primary Examiner* — Randy Boyer
*Assistant Examiner* — Juan C Valencia
(74) *Attorney, Agent, or Firm* — Crowe & Dunlevy, P.C.

(57) ABSTRACT

Green demulsifiers useful for demulsifying emulsions of water and crude oil are made by reacting together an alcohol, a multifunctional acid and/or anhydride, and a fatty acid, and optionally a polyol that is polyethylene glycol and/or polypropylene glycol. The green demulsifier has ester bonds between the reactant moieties. These ester bonds can hydrolyze which results in relatively high biodegradation.

12 Claims, 2 Drawing Sheets

US 11,981,871 B1

METHODS OF DESIGNING GREEN DEMULSIFIERS

TECHNICAL FIELD

The present invention relates to demulsifiers and methods for designing and using them, and more particularly relates to green demulsifiers which have a relatively high degree of biodegradability.

BACKGROUND

To date, a variety of methods have been developed to help break oil/water emulsions and separate the water from the oil in fluid streams accompanying the production and refining of oil from subterranean reservoirs to improve the quality of the oil recovered from subterranean reservoirs as well as to improve the quality of the separated water.

The most common method of emulsion treatment in production and refining operations is adding chemical demulsifiers to the oilfield fluid stream. These chemicals are designed to neutralize the stabilizing effect that the natural surfactants found in crude oil, such as asphaltenes and paraffins, have on oilfield emulsions. Chemical demulsifiers are surface-active compounds that, when added to the emulsion, migrate to the oil/water interface, rupture or weaken the rigid film, and enhance water droplet coalescence for easier removal of water from oil in a fluid stream containing mixtures or emulsions of oil and water.

Given the increasing global demands for oil and tightening environmental requirements for disposal of water, there is an ongoing need to develop more efficient and cost-effective treatments for separating oil from water in streams containing oil/water mixtures and emulsions in order to optimize oil recovery and to make sure that such streams may be properly processed and meet the standards set for discharge or reuse.

However, as environmental regulations become more restrictive across the world, there is an increasing need for "green" demulsifiers that readily biodegrade.

Therefore, there is a particular ongoing need for demulsifiers for separating emulsions of water and oil, and in particular water and crude oil, while minimizing adverse effects on the environment.

SUMMARY

There is provided, in one form, a method for designing a green demulsifier, where the method includes: reacting components comprising at least one alcohol and at least one multifunctional acid and/or anhydride, and optionally at least one polyol selected from the group consisting of polyethylene glycol, polypropylene glycol together, introduced in any order, to give a polymer, then reacting the polymer with at least one fatty acid to give the green demulsifier; where the green demulsifier has structure C:

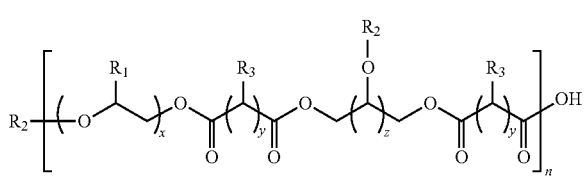

C where:
each $R_1$ is independently $CH_3$ or hydrogen;
each $R_2$ is independently the same or different fatty acid or hydrogen;
each $R_3$ is hydrogen or a carboxylic group or hydroxyl group;
x ranges from 0 to 100;
y ranges from 1 to 30;
z ranges from 1 to 50; and
n ranges from 2 to 300.

As defined herein, when $R_2$ is defined as a fatty acid is meant a fatty acid moiety after reaction. In one non-limiting example, for instance, $R_2$ can be represented by the following group: $O=C^*-CH_2(CH_2)_{16}CH_3$.

In the method and compositions described herein, there is a reaction between alcohol, diacid, and polyol, which results in ester linkages between all reagents. These ester bonds are mainly responsible for good biodegradation. In the method and compositions described herein, an alcohol is not reacted with an alkylene oxide such as ethylene oxide and/or propylene oxide, which would result in ether bonds between alcohol and resulting polyol.

There is further provided in another non-limiting form, green demulsifiers having structure C.

In another non-limiting embodiment, there is provided a method for demulsifying emulsions of oil and water using green demulsifiers having structure C.

DETAILED DESCRIPTION

Figure 1:
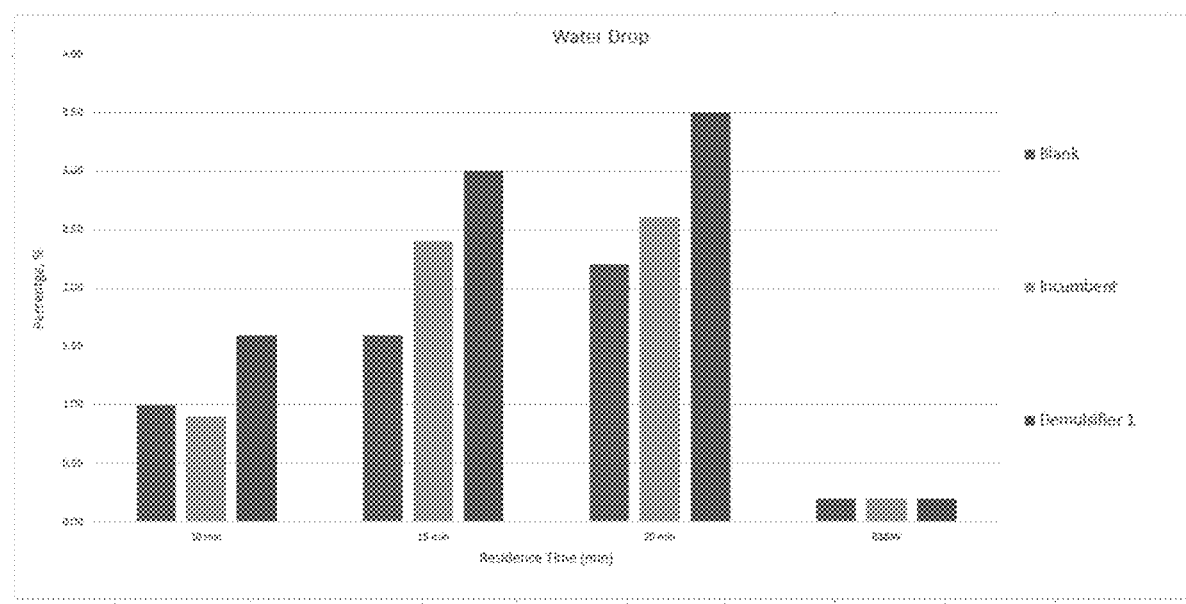
FIG. 1 a chart of water drop and of BS&W measured as a percentage as a function of time for three possibilities: a blank, an incumbent demulsifier, and a green demulsifier made as described herein.

A new method of designing green demulsifiers has been discovered that involves the reaction product(s) of alcohols, multifunctional acids and/or anhydrides, fatty acids, and optionally polyethylene glycols (PEGs) and/or polypropylene glycols (PPGs), and as components of the demulsifiers. These demulsifier molecules synthesized in a novel way achieve a biodegradation greater than 40% in 60 days and are effective in breaking water and hydrocarbon emulsions. This biodegradation is one non-limiting definition of a "green demulsifier". In another non-limiting definition, the green demulsifiers herein have greater than 20% biodegradation after 28 days, at a minimum.

The method of designing green demulsifiers herein provides a route to a new class of environmentally benign molecules available for demulsification in a market where there is largely a void of such chemistry. This class of molecules is synthesized in a novel way to afford effective demulsification as well as displaying environmentally responsive characteristics. There is a market for environmentally benign demulsifiers and demulsifier intermediates.

Demulsifiers interact with emulsion causing agents and/or natural surfactants in hydrocarbon and water mixtures (e.g., emulsions) and bring about coalescence of water droplets which enhance oil recovery and allow the oil to be processed further into finished products. Also, due to environmental regulations, demulsifiers that do not achieve greater than 20% biodegradation in 28 days face application issues in some jurisdictions, especially in the European Union. Providing demulsifiers that meet the environmental requirements solves this problem.

It will be demonstrated that the new environmentally benign demulsifiers break oil-in-water emulsions. In one non-limiting embodiment, the oil in the emulsion is crude oil. The demulsifiers are effective in coalescing water in different types of crudes, and can achieve up to 45% water drop, in one non-limiting embodiment. However, it will be appreciated that there are different ways to calculate water drop, and some (demulsifier) DMO intermediates may not drop any water but still help with dehydration and/or BS (basic sediment). The demulsifiers also show great performance in top oil dehydration and achieving low basic sediment and water (BS&W). In addition, their environmental profile showed >20% and >40% biodegradation in 60 days.

As mentioned, the method for designing a green demulsifier includes reacting together in any order components including, but not necessarily limited to, at least one alcohol; at least one multifunctional acid and/or anhydride; at least one fatty acid; and optionally at least one polyol selected from the group consisting of a polyethylene glycol (PEG), a polypropylene glycol (PPG), and combinations thereof.

The degree of polymerization of the optional PEG may range from about 1 independently to about 100; alternatively, from about 2 independently to about 90; in another non-restrictive version from about 4 independently to about 80; in another non-limiting embodiment from about 4 independently to about 50; alternatively, from about 4 to about 15; in a different non-restrictive version from about to 2 independently about 10. It will be appreciated that the term "independently" as used herein with respect to a range means that any endpoint may be used together with any other endpoint to provide a suitable or acceptable alternative range.

The degree of polymerization of the optional PPG may range from about 1 independently to about 100; alternatively, from about 2 independently to about 90; in another non-restrictive version from about 5 to about 80; in another non-limiting embodiment from about 8 to about 50; alternatively, from about 10 to about 15.

Specific examples of the at least one alcohol include, but are not necessarily limited to, glycerol, pentaerythritol, sugar alcohols selected from the group consisting of C4 polyols, C5 polyols, and C6 polyols, and combinations thereof. Suitable C4 polyols include but are not necessarily limited to, threitol and erythritol, and the like, and combinations thereof. Suitable C5 polyols include but are not necessarily limited to, inositol, arabitol, and xylitol, and the like, and combinations thereof. Suitable C6 polyols include but are not necessarily limited to sorbitol and the like.

Suitable specific multifunctional acids and/or anhydrides include but are not necessarily limited to adipic acid, succinic acid, oxalic acid, malic acid, citric acid, maleic anhydride, pyromellitic anhydride, malonic acid, glutaric acid, adipic acid, pimelic acid, suberic acid, azelaic acid, sebacic acid, dimer acids, trimer acids, vinyl acids, chlorides of dimer acids, chlorides of trimer acids, and combinations thereof.

Suitable specific fatty acid include, but are not necessarily limited to oleic acid, lauric acid, decanoic acids, dodecanoic acid, hexanoic acid, 2-ethylhexanoic acid, neodecanoic acid, mixtures of C6-C30 fatty acids (which are sometimes also called "neodecanoic acid"), capric acid, lauric acid, myristic acid, palmitic acid, stearic acid, behenic acid, and combinations thereof.

In one non-limiting embodiment, in the method for designing the green demulsifiers, the components are present in the following proportions:

from about 10 independently to about 60 wt % of the at least one alcohol; alternatively, from about 20 independently to about 40 wt %;

from about 10 to about 60 wt % of the at least one multifunctional acid and/or anhydride alternatively from about 20 independently to about 40 wt %;

from about 1 to about 20 wt % of at least one fatty acid; alternatively, from about 5 independently to about 15 wt %; and optionally from about 0 to about 20 wt % of at least one polyol; alternatively, from about 5 independently to about 15 wt %.

In one non-limiting embodiment, the components are reacted together at a temperature ranging from about 40° C. independently to about 250° C.; alternatively, from about 120° C. independently to about 170° C. In another non-limiting embodiment, for these reaction temperatures, the alcohol proportion is about 20 wt %, the diacid proportion is about 40 wt %, the polyol proportion is about 20 wt %, and the fatty acid proportion is about 20 wt %.

The reaction pressure is not critical. In one non-limiting embodiment the pressure may range from 0.1 atm to 1 atm. While a catalyst is not required for the reaction, some reactions may be more efficient with the inclusion of an acid or a base catalyst; classic catalysts for esterification reactions. The components readily react under these conditions.

In another non-limiting embodiment, a sequence of additions or reactions is as follows, but the order of addition or reactions can be done in several different ways.

In one non-restrictive version the synthesis is:

Step 1: reaction between optional polyol, multifunctional acid and/or anhydride, and alcohol.

Step 2: reaction of the polymer formed in Step 1 with the fatty acid.

In another non-limiting embodiment, the following sequence may be used:

Step 1: diacid plus polyol,

Step 2: addition of the alcohol to the Step 1 composition; and

Step 3: addition of the fatty acid to the Step 2 composition.

The green demulsifiers have multifunctional acid moieties, alcohol moieties, and optionally polyol moieties with ester bonds (from the fatty acids) between the moieties. For instance, see the chemical structure in Example 1 where the ester bonds are shown. The ester bonds can hydrolyze, and that is why the biodegradation of these green demulsifiers is relatively high.

The green demulsifiers may have a variety of structures including, but not necessarily limited to, those of structures A, B, or C below. In each of these structures, where R or $R_2$ is independently a fatty acid (technically the moiety thereof), it should be understood that these substituents represent a mixture of different fatty acids, but also encompasses the case where the fatty acid is the same for each R or $R_x$.

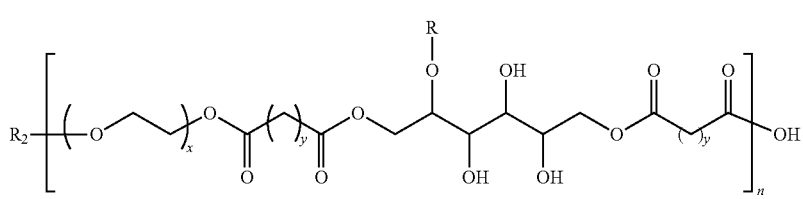

A where:
each R is independently the same or different fatty acid;
x ranges from 0 to 100, alternatively from 0 to 15;
y ranges from 1 to 30, alternatively from 1 to 10; and
n ranges from 2 to 300, alternatively from 2 to 50.

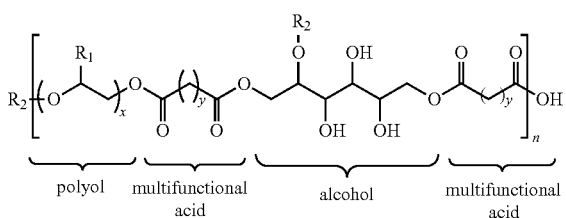

B where:
each $R_1$ is independently $CH_3$ or hydrogen;
each $R_2$ is independently the same or different fatty acid or hydrogen;
x ranges from 0 to 100, alternatively from 0 to 15;
y ranges from 1 to 30, alternatively from 1 to 10; and
n ranges from 2 to 300, alternatively from 2 to 50.
The polyol moiety (if present), multifunctional acid moieties, and alcohol moieties are explicitly labeled for structure B, but these labels may be similarly applied to structures A and C.

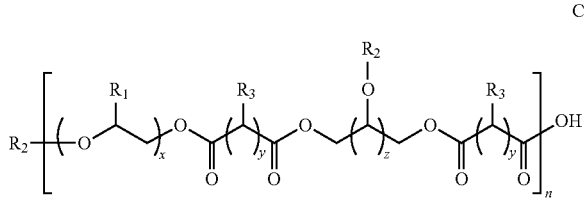

C where:
each $R_1$ is independently $CH_3$ or hydrogen;
each $R_2$ is independently the same or different fatty acid or hydrogen;
each $R_3$ is independently hydrogen or carboxylic group or hydroxyl group;
x ranges from 0 to 100, alternatively from 0 to 15;
y ranges from 1 to 30, alternatively from 1 to 10;
z ranges from 1 to 50, alternatively from 1 to 10; and
n ranges from 2 to 300, alternatively from 2 to 50.

In a non-limiting embodiment, for each of structures A, B, and C:

The ratio of multifunctional acid (or anhydride) to alcohol+optional polyol ranges from 10/1 to 1/10 mol/mol; alternatively, from 2/1 to 1/2 mol/mol.

The ratio of alcohol to optional polyol ranges from about 100 wt % to about 5 wt % of alcohol; alternatively, from about 100 wt % to about 40 wt %.

The ratio of alcohol to fatty acid ranges from 1/10 to 10/1 mol/mol; alternatively, from 1/3 to 3/1.

In the method for demulsifying an emulsion of oil and water, an effective amount of the green demulsifier ranges from about 0.001 independently to about 0.5 vol % based on the emulsion; alternatively, from about 0.005 independently to about 0.1 vol %.

The invention will be further described with respect to the following Examples, which are not meant to limit the invention, but rather to further illustrate some embodiments.

EXAMPLES

Example 1

Shown below is a molecular design of Demulsifier 1 using succinic acid reacted with PEG-200, then the addition of sorbitol, and finally the addition of 2-ethylhexanoic acid.

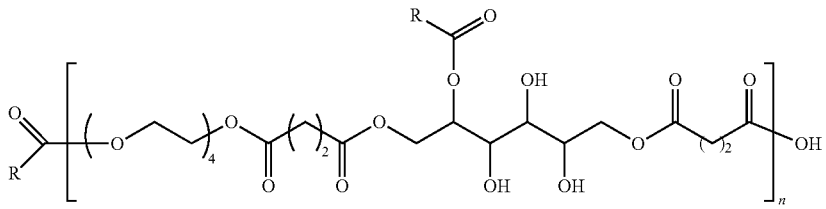

Where R = $C_8H_{15}$

Examples 2-4

Shown in Table I are the results of water drop tests for a blank, an incumbent demulsifier, and green Demulsifier 1, shown above, and made according to the method described herein. BS&W results are also reported. The water drop results for 10 minutes, 15 minutes, 20 minutes, and the BS&W results are also plotted in FIG. 1.

TABLE I

Novel Green Demulsifier 1 Showing Better Water Dropping Performance vs. Incumbent in Crude Oil

| Ex. | Product | PPM | 1 min. | 5 min. | 10 min. | 15 min. | 20 min. | BS&W |
|---|---|---|---|---|---|---|---|---|
| 2 | Blank | 0 | 0.00 | 0.00 | 1.00 | 1.60 | 2.20 | 0.20 |
| 3 | Incumbent | 15 | 0.00 | 0.10 | 0.90 | 2.40 | 2.60 | 0.20 |
| 4 | Demulsifier 1 | 15 | 0.00 | 0.25 | 1.60 | 3.00 | 3.50 | 0.20 |

Example 5

Figure 2:
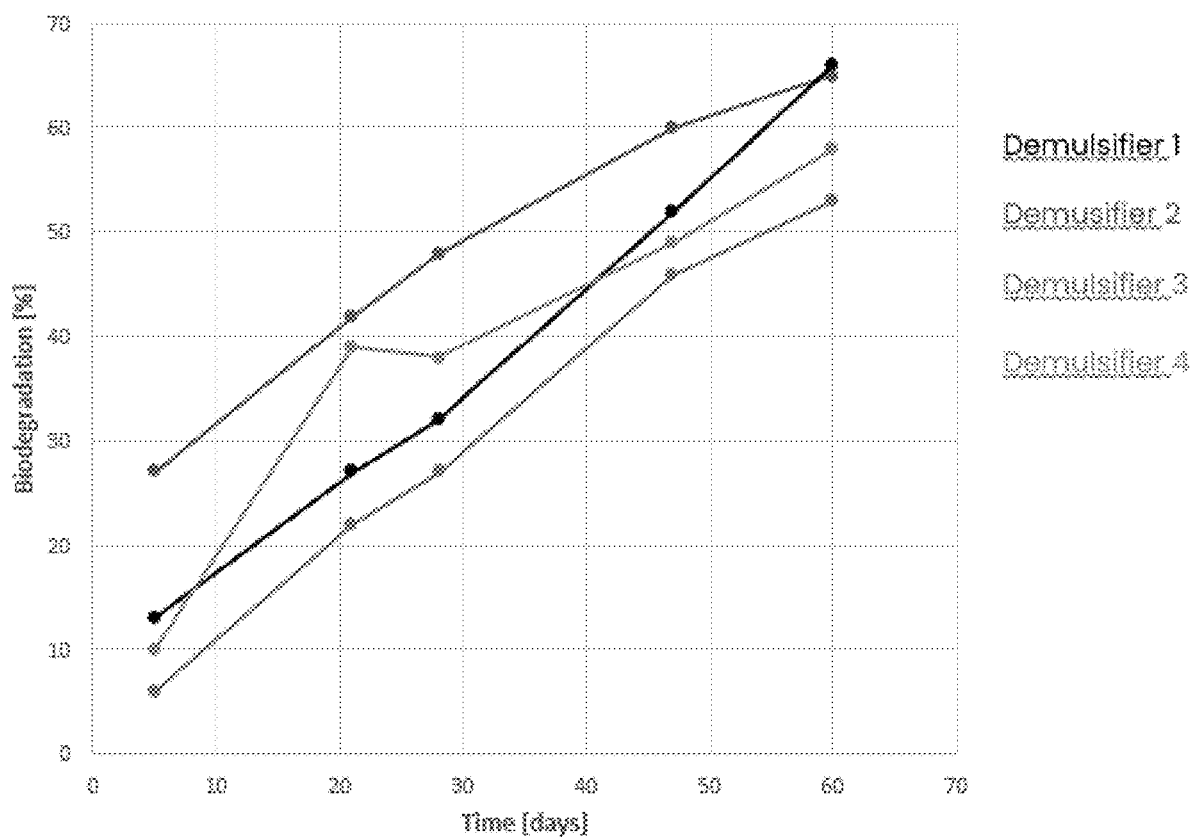
FIG. 2 is a chart of biodegradation as a function of time for four demulsifiers.

FIG. 2 is a chart of biodegradation, expressed as a percentage, as a function of time for four new demulsifiers designed by the method described herein. Demulsifier 1 has already been described. The other new demulsifiers are described below.

Demulsifier 2 is a reaction product of PEG-200 and adipic acid with sorbitol and neodecanoic acid.

Demulsifier 3 is a reaction product of PEG-200 and citric acid with sorbitol and 2-ethylhexanoic acid.

Demulsifier 4 is a reaction product of PEG-200 and citric acid with sorbitol and hexanoic acid.

These data demonstrate that the demulsifiers made as described herein biodegrade sufficiently to be called "green" as defined herein.

In the foregoing specification, the invention has been described with reference to specific embodiments thereof. However, it will be evident that various modifications and changes can be made thereto without departing from the broader spirit or scope of the invention as set forth in the appended claims. Accordingly, the specification is to be regarded in an illustrative rather than a restrictive sense. For example, uses, reactions, reaction conditions, alcohols, multifunctional acids and/or anhydrides, PEGs, PPGs, fatty acids, compositions, proportions, amounts, and orders of additions not specifically identified or described in this disclosure or not evaluated in a particular Example are still expected to be within the scope of this invention.

The present invention may suitably comprise, consist or consist essentially of the elements disclosed and may be practiced in the absence of an element not disclosed. For instance, there may be further provided a method for designing a green demulsifier, the method comprising, consisting essentially of, or consisting of, reacting together components comprising, consisting essentially of, or consisting of, at least one alcohol, at least one multifunctional acid and/or anhydride, and optionally at least one polyol selected from the group consisting of polyethylene glycol, polypropylene glycol, and combinations thereof, introduced in any order, to give a polymer, and reacting the polymer with and at least one fatty acid to give the green demulsifier, where the green demulsifier has a structure selected from the group consisting of A, B, and C.

There may be further provided a green demulsifier having any one of the structures from the group consisting of A, B, and C.

Furthermore there may be provided a method for demulsifying an emulsion of oil and water, the method comprising, consisting essentially of, or consisting of, adding to the emulsion of oil and water an effective amount of a green demulsifier to at least partially demulsify the emulsion, where the green demulsifier has the structure selected from the group consisting of A, B, and C.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A method for designing a green demulsifier, the method comprising:

reacting together components comprising:
   at least one alcohol;
   at least one multifunctional acid and/or anhydride; and
   optionally at least one polyol selected from the group consisting of polyethylene glycol, polypropylene glycol, and combinations thereof,
introduced in any order, to give a polymer; and
reacting the polymer with at least one fatty acid to give the green demulsifier, where the green demulsifier has structure C:

$$R_2 \!-\!\!\left[\!\!\left(\!O\!\!\underset{x}{\overset{R_1}{\frown}}\!\right)\!\!O\underset{\underset{O}{\|}}{\overset{R_3}{\frown}}\!\!\left(\!\!\underset{y}{\overset{}{\frown}}\!\right)\!\!O\!\!\left(\!\!\underset{z}{\overset{R_2\!-\!O}{\frown}}\!\right)\!\!O\underset{\underset{O}{\|}}{\overset{R_3}{\frown}}\!\!\left(\!\!\underset{y}{\overset{}{\frown}}\!\right)\!\!OH\right]_n$$  C where:
   each $R_1$ is independently $CH_3$ or hydrogen;
   each $R_2$ is independently the same or different fatty acid or hydrogen;
   each $R_3$ is hydrogen or a carboxylic group or hydroxyl group;
   x each independently ranges from 0 to 100;
   y each independently ranges from 1 to 30;
   z ranges from 1 to 50; and
   n ranges from 2 to 300.

2. The method of claim 1 where:
   the at least one alcohol is selected from the group consisting of glycerol, pentaerythritol, sugar alcohols selected from the group consisting of C4 polyols, C5 polyols, and C6 polyols, and combinations thereof;
   the at least one multifunctional acid and/or anhydride is selected from the group consisting of adipic acid, succinic acid, oxalic acid, malic acid, citric acid, maleic anhydride, pyromellitic anhydride, malonic acid, glutaric acid, adipic acid, pimelic acid, suberic acid, azelaic acid, sebacic acid, dimer acids, trimer acids, vinyl acids, chlorides of dimer acids, chlorides of trimer acids, and combinations thereof; and the at least one fatty acid is selected from the group consisting of oleic acid, lauric acid, decanoic acids, dodecanoic acid, hexanoic acid, 2-ethylhexanoic acid, neodecanoic acid, mixtures of C6-C30 fatty acids, capric acid, lauric acid, myristic acid, palmitic acid, stearic acid, behenic acid, and combinations thereof.

3. The method of claim 1 where the components are present in the following proportions:
from about 10 to about 60 wt % of the at least one alcohol;
from about 10 to about 60 wt % of the at least one multifunctional acid and/or anhydride;
from about 1 to about 20 wt % of at least one fatty acid; and
from about 1 to about 20 wt % of at least one polyol, if present.

4. The method of claim 1 where the components are reacted together at a temperature ranging from about 40° C. to about 250° C.

5. The method of claim 1 where the components are reacted together at a temperature ranging from about 120° C. to about 170° C.

6. The method of claim 1 where the green demulsifier has greater than 20% biodegradation after 28 days.

7. A method for demulsifying an emulsion of oil and water, the method comprising: adding to the emulsion of oil and water an effective amount of a green demulsifier to at least partially demulsify the emulsion, where the green demulsifier has structure C:

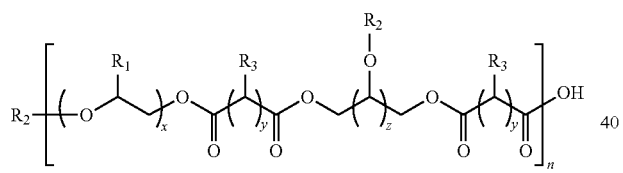

C where:
each $R_1$ is independently $CH_3$ or hydrogen;
each $R_2$ is independently the same or different fatty acid or hydrogen;
each $R_3$ is hydrogen or a carboxylic group or hydroxyl group;
x each independently ranges from 0 to 100;
y each independently ranges from 1 to 30;
z each independently ranges from 1 to 50; and
n ranges from 2 to 300.

8. The method of claim 7 where in the green demulsifier:
x each independently ranges from 0 to 15;
y each independently ranges from 1 to 10;
z each independently range from 1 to 10; and
n ranges from 2 to 50.

9. The method of claim 7 where the effective amount of the green demulsifier ranges from about 0.001 to about 0.5 vol % based on the emulsion.

10. The method of claim 7 where the oil is crude oil.

11. The method of claim 7 where the green demulsifier has greater than 20% biodegradation after 28 days.

12. A green demulsifier having structure C:

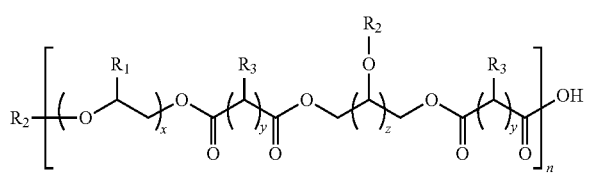

C where:
each $R_2$ is independently the same or different fatty acid or hydrogen;
each $R_2$ is independently fatty acid or hydrogen;
each $R_3$ is hydrogen or a carboxylic group;
x each independently ranges from 0 to 100;
y each independently ranges from 1 to 30;
z ranges from 1 to 50; and
n ranges from 2 to 300.

* * * * *